Figure 1:

Dec. 19, 1939.   F. F. SCHWARTZ   2,184,153
MANUFACTURE OF ELASTIC FABRICS
Filed Nov. 27, 1936

INVENTOR
FERNAND FREDERIC SCHWARTZ
BY
Stebbing, Blenkot Parmelee
his ATTORNEYS

Patented Dec. 19, 1939

2,184,153

UNITED STATES PATENT OFFICE 2,184,153

MANUFACTURE OF ELASTIC FABRICS

Fernand Frederic Schwartz, Paris, France, assignor, by mesne assignments, to American Ecla Corporation, Dover, Del., a corporation of Delaware Application November 27, 1936, Serial No. 112,972
In France March 21, 1936

2 Claims. (Cl. 91—68)

It is an object of the present invention to provide a new textile product and a new process for obtaining that product by applying rubber or other elastic material to the surface of a fabric in such a way as to leave the threads free to slide one upon the other although the rubber adheres effectively to the threads. In this way it is possible to obtain fabrics which possess in high degree the properties of elasticity and strength.

In order to carry the invention into effect there is projected on to the surface of the woven or knitted fabric with the aid of a spray-gun rubber latex containing those substances necessary to bring about subsequently the vulcanization of the rubber. The application of the latex is carried out in such a way that only the projecting or salient surfaces of the fabric are covered with the latex. The particles of latex unite with one another and form on the surface of the fabric a network of rubber adhering to the fabric. Those portions of the fabric which are in intaglio or present depressions are not covered with rubber and the woven or knitted fabric remains porous and permeable to air.

In order to obtain the result described above it is necessary to regulate the spraying of the latex so that the droplets of latex possess the appropriate size. Other factors which have to be controlled are the viscosity of the liquid, the speed of coagulation of the latex, the pressure of air employed in the spray-gun and the distance between the spray-gun and the surface of the fabric to be treated. By the adjustment of these factors it is possible to ensure that the latex penetrates the fabric only to a slight depth and covers substantially only the projecting portions of the fabric.

Preferably the latex is applied by means of a series of spraying operations, each coating of latex being allowed to dry before a subsequent coating is deposited. This invention may be applied to the treatment of fabrics which possess extensibility in one or more directions. Thus, knitted fabrics which are either plain or ribbed may be employed.

In general, the latex is only applied to one surface of the fabric and in the simplest case the fabric thus obtained can be employed as such after vulcanisation. More often, however, two fabrics are juxtaposed by bringing into contact the rubberized faces and allowing the faces which do not carry any rubber to show. A slight pressure is applied for sticking the two fabrics together and the composite fabric is dried and vulcanised.

It is also possible to apply a layer of rubber latex to both faces of a woven or knitted fabric which is then interposed between two others, the external faces whereof do not carry any rubber.

In superposing knitted fabrics to form the final product the ribs may be crossed at any suitable angle.

The accompanying drawing illustrates the invention.

In Figure 1 there is shown on a greatly enlarged scale a small section of fabric 13.

Figure 2:
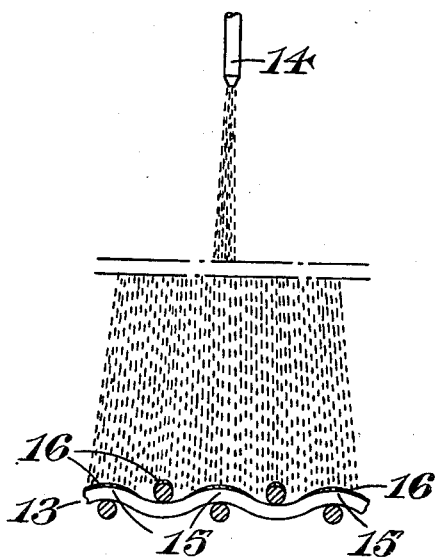

Figure 2 shows the application of latex by means of a spray-gun 14 to one side of the fabric shown in Figure 1, the coating of latex 16 being applied only to the projecting or salient surfaces 15 of the fabric and not to any appreciable extent to those portions in intaglio.

Figure 3:
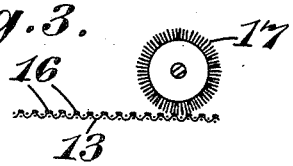

Figure 3 shows on a smaller scale a piece of fabric 13 to which rubber 16 has been applied as described above and shows the treatment of the rubberised surface with a rotating brush 17 dipped in benzene.

Figure 4:
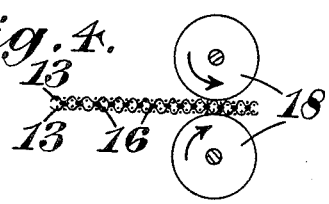

In Figure 4 two sheets of fabric after treatment as shown in Figure 3 are brought together face to face and united by the application of gentle pressure (diagrammatically indicated by rollers 18).

Figure 5:
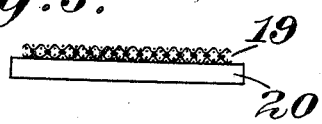

Figure 5 shows the vulcanisation of the rubber by supporting the composite fabric indicated by reference numeral 19 on a heated plate 20.

Following is a description by way of example only of one method of carrying the invention into effect.

A knitted ribbed fabric is coated by means of a spraying device with latex particles containing vulcanising agents and an accelerator. The latex solution preferably contains a weak electrolyte, for example ammonium borate which acts as a coagulant at the moment at which the latex loses part of its ammonia by evaporation. There may alternatively be employed ammonium acetate or an ammoniacal complex of zinc borate or zinc acetate or another salt of zinc having a weak acid radical.

The distance between the nozzle of the spraying device and the surface to be treated may be about 30 to 40 cm. for an air pressure of 2 to 3 atmospheres. A solution containing about 40% of solid matter may be employed. The rate of coagulation of the projected particles is about ½ to 1 second and the dimensions of the droplets are about 0.1 to 0.3 mm. in diameter. With these numerical data the special effect is obtained so that the projected particles only cover the projecting parts of the fabric. This result may be attributed to the following phenomenon: in passing through the air, the particles acquire an electric charge differing from that of the knitted fabric and this charge is sufficient to enable them to be attracted by the projecting parts of the textile material. On these projecting parts the particles unite to form threads which interlace to form a superficial network which adheres absolutely to the knitted fabric.

As already stated, it is advantageous to effect the application of the latex in a number of stages, the latex being allowed to dry between successive applications.

The knitted fabric is then dried and cut up and its surface rubbed up with a cloth or brush dipped in benzene. This treatment increases the adhesive power of the unvulcanized rubber.

All these operations may be effected in a continuous manner by means of the appropriate mechanical devices. Two knitted fabrics thus coated are then superposed, the rubberised faces being brought into contact in such a way that the ribs cross at a suitable angle. The composite fabric is then submitted to slight pressure and dried thoroughly and then vulcanised by the usual methods, preferably without pressure.

Absence of pressure is often desirable in order to prevent the sticking of the threads at their points of intersection during vulcanisation, this sticking preventing the elements of the fabric from sliding one over the other and rendering the elastic deformation of the fabric less perfect.

The elastic fabric thus produced is perfectly permeable to air. It can be dyed or treated with any kind of dressings improving its appearance. Its price is very low and its properties are superior to those of fabrics prepared heretofore by incorporating covered thread in the textile elements. If in such fabrics a covered thread breaks, the fabric loses its elasticity throughout the entire length of such threads. In the case of products formed by the present invention holes may be made in the fabric without diminishing its elastic properties due to the fact that the rubber is firmly fixed at all points of its surface to the fabric.

It will be understood that the above details are given by way of example and not by way of limitation.

I claim:

1. A process for the manufacture of a porous elastic fabric which comprises applying by spraying to the projecting portions of an extensible fabric a series of coatings of latex in the form of a spray the droplets whereof having a diameter of 0.1 to 0.3 mm. and a rate of coagulation between ½ and 1 second, the spraying means being situated between 30 and 40 cms. from the surface of the fabric and the latex being forced under an air pressure of 2 to 3 atmospheres, and coagulating and drying the coatings before applying the succeeding coating.

2. A process for the manufacture of a porous elastic fabric which comprises applying by spraying to the projecting portions of an extensible fabric a series of coatings of rubber latex which contains ammonium borate, the latex being applied in the form of a spray the droplets whereof have a diameter of 0.1 to 0.3 mm. and a rate of coagulation between one-half and one second, the spraying means being situated between 30 and 40 cms. from the surface of the fabric and the latex being forced under an air pressure of 2 to 3 atmospheres, and coagulating and drying one coating of latex before applying the succeeding coating.

FERNAND FREDERIC SCHWARTZ.